US012621506B2

(12) United States Patent
Xue et al.

(10) Patent No.: US 12,621,506 B2
(45) Date of Patent: May 5, 2026

(54) CONTENT ADAPTIVE MICRO ENCODING OPTIMIZATION FOR VIDEO

(71) Applicants: Disney Enterprises, Inc., Burbank, CA (US); Beijing YoJaJa Software Technology Development Co., Ltd., Beijing (CN)

(72) Inventors: Yuanyi Xue, Alameda, CA (US); Roberto Gerson De Albuquerque Azevedo, Zürich (CH); Christopher Richard Schroers, Uster (CH); Scott Labrozzi, Carey, NC (US); Wenhao Zhang, Beijing (CN)

(73) Assignees: Disney Enterprises, Inc., Burbank, CA (US); Beijing YoJaJa Software Technology Development Co., Ltd., Beijing (CN)

( * ) Notice: Subject to any disclaimer, the term of this patent is extended or adjusted under 35 U.S.C. 154(b) by 222 days.

(21) Appl. No.: 18/474,065

(22) Filed: Sep. 25, 2023

(65) Prior Publication Data

US 2025/0106408 A1     Mar. 27, 2025

(51) Int. Cl.
*H04N 21/234*     (2011.01)
*G06V 10/25*     (2022.01)
(Continued)

(52) U.S. Cl.
CPC ....... *H04N 21/23418* (2013.01); *G06V 10/25* (2022.01); *G06V 10/762* (2022.01);
(Continued)

(58) Field of Classification Search
None
See application file for complete search history.

(56) References Cited

U.S. PATENT DOCUMENTS 7,864,840 B2     1/2011   Labrozzi et al.
2006/0233236 A1   10/2006   Labrozzi et al.
(Continued)

FOREIGN PATENT DOCUMENTS

EP          1177691 B1     2/2002
JP          2009500951 A    1/2009
WO          2007005750 A2   1/2007

OTHER PUBLICATIONS

Wu et al. "Scene Consistency Representation Learning for Video Scene Segmentation" (Year: 2022).*
(Continued)

*Primary Examiner* — Mohammed Jebari
(74) *Attorney, Agent, or Firm* — Kwan & Olynick LLP

(57) ABSTRACT

In some embodiments, a method analyzes flagged locations from a plurality of locations in an encoding of a video to form a cluster of locations. Draft micro-chunk boundaries for the cluster are determined based on searching for a first start location and a first end location in the encoding. The method searches in a first search range before the first start location and a second search range after the first end location for a second start location in the first search range and a second end location in the second search range. The second start location and the second end location form a micro-chunk. An encoding parameter set is determined for the micro-chunk formed by the second start location and the second end location based on content characteristics of the micro-chunk. The method uses the encoding parameter set to encode the micro-chunk for insertion in the encoding of the video.

20 Claims, 12 Drawing Sheets

100

(51) Int. Cl.

| | |
|---|---|
| *G06V 10/762* | (2022.01) |
| *H04N 19/142* | (2014.01) |
| *H04N 19/154* | (2014.01) |
| *H04N 19/172* | (2014.01) |
| *H04N 19/176* | (2014.01) |
| *H04N 19/179* | (2014.01) |
| *H04N 19/192* | (2014.01) |
| *H04N 19/46* | (2014.01) |
| *H04N 21/81* | (2011.01) |
| *H04N 21/845* | (2011.01) |

(52) U.S. Cl.
CPC ......... *H04N 19/142* (2014.11); *H04N 19/154* (2014.11); *H04N 19/172* (2014.11); *H04N 19/176* (2014.11); *H04N 19/179* (2014.11); *H04N 19/192* (2014.11); *H04N 19/46* (2014.11); *H04N 21/23424* (2013.01); *H04N 21/812* (2013.01); *H04N 21/8456* (2013.01)

(56) References Cited

U.S. PATENT DOCUMENTS

| | | | |
|---|---|---|---|
| 2010/0272173 A1* | 10/2010 | Puri ..................... | H04N 19/172 375/240.03 |
| 2011/0255535 A1* | 10/2011 | Tinsman .......... | G06F 15/17318 370/401 |
| 2012/0259894 A1* | 10/2012 | Varley .................. | G06F 16/954 707/795 |
| 2012/0275512 A1 | 11/2012 | Bouton et al. | |
| 2015/0189222 A1* | 7/2015 | John ................ | H04N 21/44008 348/441 |
| 2016/0073106 A1* | 3/2016 | Su ...................... | H04N 21/8456 375/240.02 |
| 2018/0176616 A1* | 6/2018 | Green .................. | H04N 21/235 |
| 2019/0075299 A1* | 3/2019 | Sethuraman ......... | H04N 19/132 |
| 2021/0006782 A1 | 1/2021 | Ramchandran et al. | |
| 2021/0076045 A1 | 3/2021 | Xue et al. | |
| 2021/0120061 A1* | 4/2021 | Labrozzi ........... | H04N 21/8456 |
| 2022/0067386 A1* | 3/2022 | Rotman ................ | G06F 18/217 |

OTHER PUBLICATIONS

Mandhane et al., "MuZero with Self-competition for Rate Control inVP9 Video Compression," arXiv:2202.06626v1 [eess.IV] Feb. 14, 2022, 20 pages.

Mnih, et al., "Asynchronous Methods for Deep Reinforcement Learning," arXiv:1602.01783v2 [cs.LG] Jun. 16, 2016, 19 pages.

Scott Labrozzi, et al., "Surgical Micro-Encoding of Content," U.S. Appl. No. 17/861,063, filed Jul. 8, 2022, 39 pages.

Extended European Search Report, European Patent Application 24188285.1, mailed Mar. 19, 2025, 13 pages.

First Office Action, Japan Application No. 2024-107092, Jul. 8, 2025, 9 pages.

Decision of Rejection, Japanese Patent Application No. 2024-107092, mailed Jan. 6, 2026, 10 pages.

* cited by examiner

FIG. 1

| Category label | Encoding paramter set |
|---|---|
| Category #1 | Encoding paramter set #1 |
| Category #2 | Encoding paramter set #2 |
| Category #3 | Encoding paramter set #3 |
| Category #4 | Encoding paramter set #4 |
| Other | Default set |

CONTENT ADAPTIVE MICRO ENCODING OPTIMIZATION FOR VIDEO

BACKGROUND

A video delivery system may offer a large number of instances of content (e.g., videos) that can be delivered to client devices. The instances of content are encoded for delivery to clients. The video delivery system may use an encoding pipeline that includes an encoder, which uses a predefined set of encoding parameters to encode the content. That is, the values of the encoding parameters may be the same for all instances of content that are encoded by the encoding pipeline. Typically, the encoding parameters are optimized for the characteristics from the best-known common content that may be encoded by the pipeline. For example, the encoding parameters may be based on characteristics of action movies if that is considered the most common content being encoded. However, the video delivery system may have a vast library of content, which may include action movies, animated movies, television shows, nature shows, etc. A problem that is experienced is that for some content, or more specifically some parts of the same instance of content, the use of the same set of encoding parameters may produce a suboptimal encoding of the instance of content or portions of the instance of content.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 1 depicts a simplified system for a video encoding pipeline according to some embodiments.

FIG. 9 depicts an example of predefined encoding parameter set for different labels according to some embodiments.

DETAILED DESCRIPTION

Figure 2:
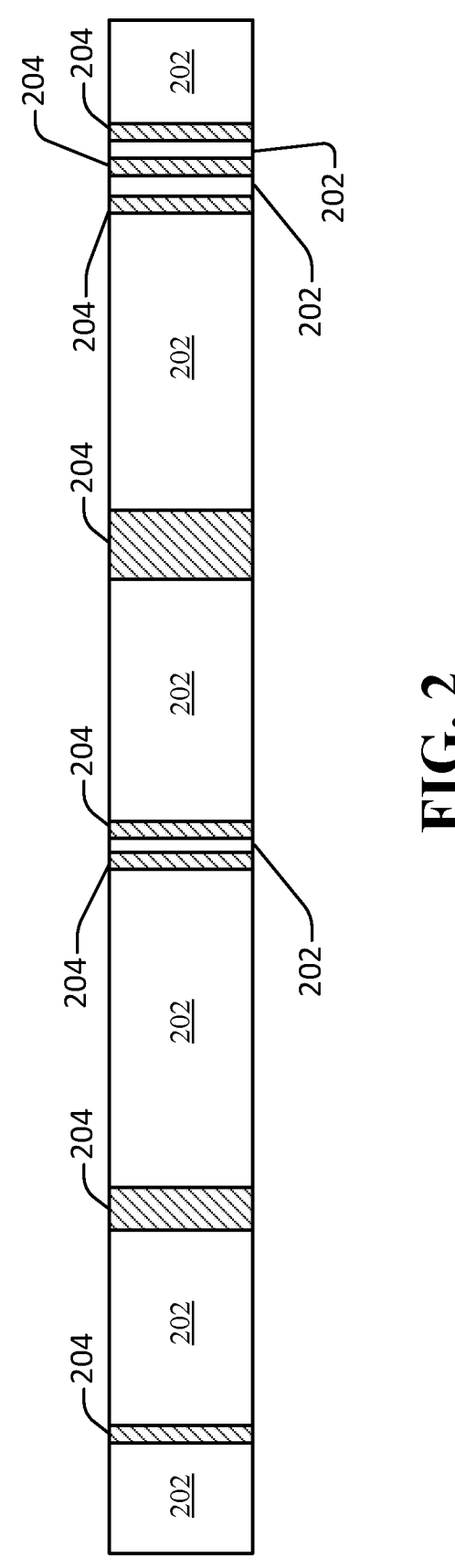
FIG. 2 depicts an example of a video encoding with good frames and flagged frames according to some embodiments.

Described herein are techniques for a video encoding system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

In some embodiments, a system may optimize encoding parameters for identified portions of an encoding for an instance of content. The following uses a video as an example of the instance of content that is being encoded, but other types of content may be appreciated, such as audio, or other content. A quality control process may identify problematic parts of the encoding that do not meet a threshold of a quality metric. These frames may be referred to as flagged frames or "bad" frames within the video. The number of flagged frames may be in the minority compared to the number of good frames that meet the quality metric threshold, but there is no guarantee as to where the flagged frames may arise prior to the encoding, and also how the flagged frames might be clustered through the video. For example, the flagged frames may last a few seconds or the flagged frames may appear for a fraction of a second. To address the problematic portions of the encoding, one solution may be to re-encode the entire video with different encoding parameters. However, this solution may have disadvantages. For example, the re-encoding of the entire video may waste computing resources. As the encoding may include a majority of good frames, re-encoding the frames that were good frames may not be needed and wastes computing resources. Also, the quality control process may also need to be re-performed on the entire encoding, which wastes additional computing resources. Further, the re-encoding of the entire video may use the same set of revised encoding parameters, which may fail to address issues on all localized portions where frames were flagged. For example, the flagged frames may still fail the quality control process because these frames include outlier characteristics of content compared to the average characteristics of the rest of the frames. In this case, if the revised encoding parameters are based on the average characteristics of the video (as opposed to the general set of encoding parameters that is initially used for all videos), this would not necessarily ensure that it would provide a better quality encoding of the flagged frames.

To improve upon the above, the system may automatically generate optimized encoding parameters for portions of a video that have been flagged with quality control issues, or other issues. The system may form clusters from the flagged frames. If multiple clusters of the video are formed, the system may optimize the encoding parameters for each cluster. This improves the encoding of the video because the system targets the encoding parameters for the characteristics of each cluster. In the process, the system retrieves locations, such as frame indices or numbers, of video frames that were flagged. A micro-chunk optimizer system generates micro-chunk boundaries, such as a start frame and an end frame in the video, based on the clusters of flagged frames. An encoding parameter tuner may analyze the content characteristics for the content associated with the micro-chunk boundary and generate an optimized encoding parameter set for the micro-chunk. Also, the system may use feedback that links the micro-chunk optimizer system and the encoding parameter tuner to optimize the micro-chunk boundary placement and the encoding parameter set generation for the video segment. The output may be an optimized encoding parameter set for each micro-chunk in the video. Then, the micro-chunks may be re-encoded using each respective optimized encoding parameter set. The resulting re-encoded micro-chunks may be inserted in the previously generated encoding using the micro-chunk boundaries to form the final encoding of the video.

Although the discussion uses the re-encoding of frames identified by a quality control process for an encoding, the process may be used for other processes. For example, the process may be used to insert frames into a video, such as in an interoperable master format (IMF) workflow that creates content for distribution. This process may encode portions of the video that are flagged using optimized encoding parameters for the portions. These portions may not fail a quality control process; rather, optimized encoding parameters are desired for the encoding process. Accordingly, the following process may be used for any process in which insertion of portions of content into an encoding is needed.

System

Figure 1:
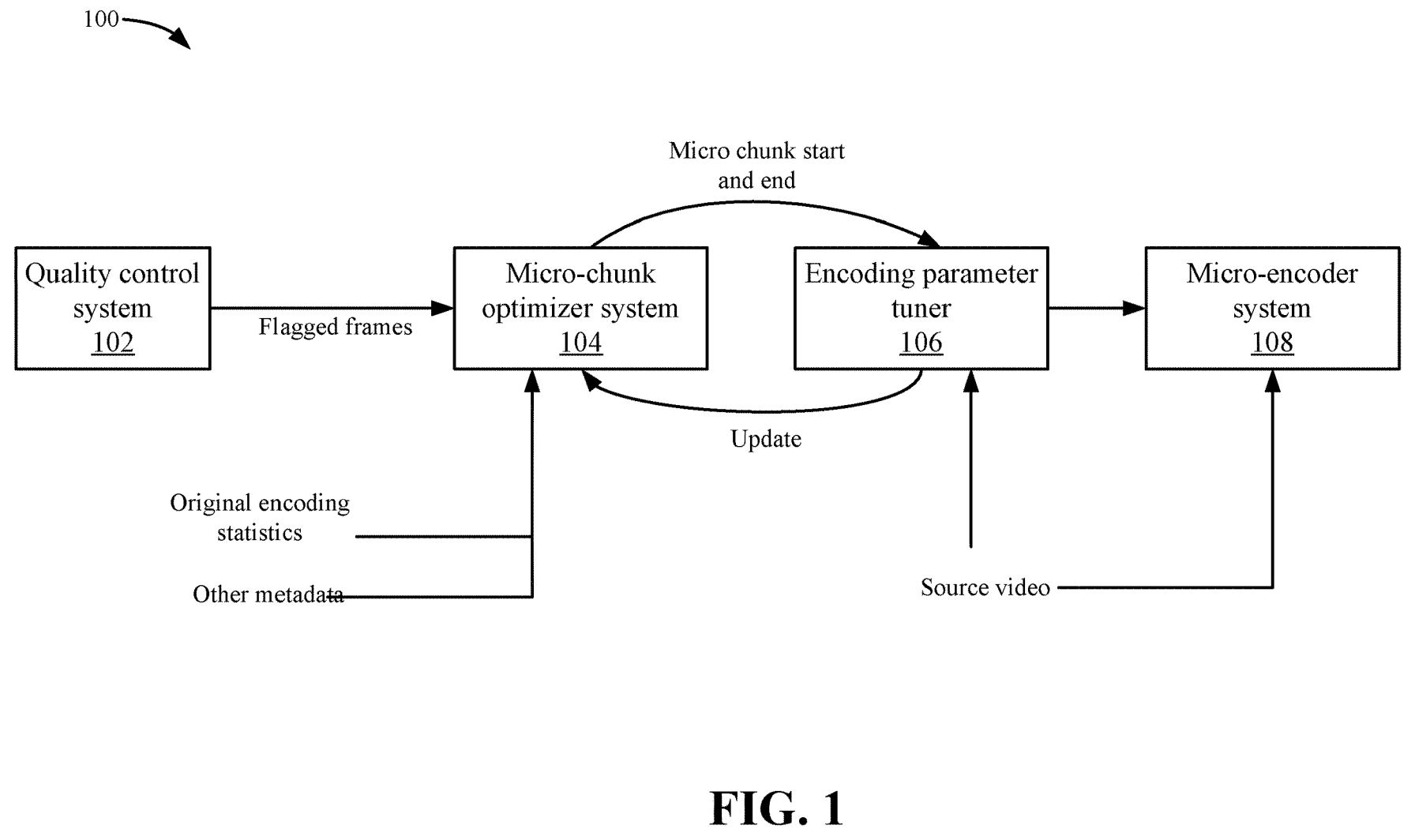

FIG. 1 depicts a simplified system 100 for a video encoding pipeline according to some embodiments. System 100 includes a quality control system 102, a micro-chunk optimizer system 104, an encoding parameter tuner 106, and a micro-encoder system 108. Entities in system 100 may be executing on a computing device, such as one or more servers.

Quality control system 102 may receive an encoding of a video. For example, an encoder may encode a video, and quality control system 102 may analyze the frames of the encoding of the video using quality metrics. Quality control system 102 may be an automatic process that automatically analyzes characteristics of the encoding or a manual quality control process in which a user analyzes the resulting encoding. Quality control system 102 may determine frames within the encoding that are flagged (e.g., problematic), such as frames that fail to meet a threshold (e.g., a peak signal to noise ratio (PSNR) does not meet a threshold). The flagged frames are frames do not meet the threshold, and other frames that do meet the threshold are considered good frames and are not flagged.

Quality control system 102 outputs the flagged frames to micro-chunk optimizer system 104. The flagged frames may be identified by a list of frame locations for the encoding. The flagged frames may be distributed or scattered across the entire duration of the video. Also, quality control system 102 may provide information that may be used for optimizing the encoding parameter set, such as quality control system 102 may indicate which quality control metrics failed for respective frames or the values of the metrics for the respective frames. Although frames are flagged, the use of frames may include other portions of the encoding, such as blocks of a frame, multiple frames, segments, etc.

Micro-chunk optimizer system 104 receives the flagged frames as input. Also, micro-chunk optimizer system 104 may receive other information related to the video, such as metadata from the original encoding statistics of encoding the video, or other metadata. The original encoding statistics of frames in the encoding, such as bitrate, resolution, frame rate, etc. The other metadata may be information that may help in optimizing the encoding parameters, such as the type of content, segment duration configuration, group of pictures (GOP) structure, duration limit of a micro-chunk, etc. Micro-chunk optimizer system 104 uses the input to generate micro-chunk boundaries for clusters of the flagged frames. For example, micro-chunk optimizer system 104 may cluster sets of flagged frames and produce micro-chunk boundaries for each cluster. Other optional information that micro-chunk optimizer system 104 may output may be a target bitrate for each of the micro-chunk boundaries and a list of forced instantaneous decoder refresh (IDR) frames that were used to generate the micro-chunk boundaries. This information may be used to tune encoding parameters or to re-encode the micro-chunks. The generation of micro-chunk boundaries will be described in more detail below.

Encoding parameter tuner 106 receives the micro-chunk boundaries, which may be a start frame index and an end frame index in the video or other location information. Also, encoding parameter tuner 106 receives the source video and uses the frames associated with the micro-chunks to generate optimal encoding parameter sets for the micro-chunks found within the micro-chunk boundaries. The output may be an optimized encoding parameter set for each micro-chunk. In some embodiments, encoding parameter tuner 106 may use different modes to generate the encoding parameter sets, such as a pre-defined mode and a continuous learning mode. In the pre-defined mode, encoding parameter tuner 106 may use a content analyzer process that determines characteristics of the micro-chunk to select a pre-defined set of characteristics from multiple predefined sets of characteristics. The selected pre-defined set of characteristics is then used to determine corresponding encoding parameters from a predefined list of encoding parameter sets. In the continuous learning process, encoding parameter tuner 106 may use a learning-based process, such as a reinforcement learning-based process, that may automatically discover and learn the optimal encoding parameter set for micro-chunks. When a revised or optimal encoding parameter set is found, the values for the encoding parameter set may be revised. For instance, the strength of de-blocking filters is an encoding parameter that can be revised based on the content type (e.g., the parameter may need to be increased in cartoon-like content when compared to live action content). Also, encoding parameter turner 106 may optimize the bitrate, optimize the encoding frame type and quantization parameter that are used for flagged frames in the micro-chunk, or perform other optimizations.

If an update on the micro-chunk boundaries is needed, the update may be sent to micro-chunk optimizer system 104, which can then generate a new micro-chunk start frame and end frame. The new micro-chunk start frame and end frame are then provided to encoding parameter tuner 106, which can then optimize the encoding parameter set for the new micro-chunk. This iterative process may take multiple iterations until the optimal micro-chunk boundaries and best set of encoding parameter sets are determined.

Once the encoding parameter set for each micro-chunk is determined, a micro-encoder system 108 may re-encode the micro-chunks according to the respective encoding parameter set. For example, micro-encoder system 108 may receive the source video and encode the portions of the video according to the micro-chunk start frame and end frames and in the respective encoding parameter sets. The encoded micro-chunks are then inserted into the encoding using the micro-chunk boundaries.

The following will now describe the micro-chunk optimizer system 104 and encoding parameter tuner 106 in more detail.

Micro-Chunk Optimizer System

The quality control process may output flagged frames that may be scattered throughout the video. Micro-chunk optimizer system 104 may receive flagged frames, and group the flagged frames into clusters. Then, micro-chunk optimizer system 104 determines a start frame and an end frame for each cluster of flagged frames. The start frame and end frame may be locations, such as frame indices in the video, and form a micro-chunk.

FIG. 2 depicts an example of a video encoding 200 with flagged frames according to some embodiments. Video encoding 202 includes good frames at 202 and flagged frames at 204. Flagged frames are shown with diagonal lines. The flagged frames at each instance may be different numbers of frames, such as one frame, two or more frames, etc. Also, each instance of flagged frames may be different numbers of frames even though the size that is shown in FIG. 2 may be somewhat similar. For example, the flagged frames may be for a fraction of a second, a few seconds, etc. As shown, the flagged frames may be scattered throughout video encoding 200 and may be less than the number of good frames. However, the flagged frames may include more numbers of frames than the good frames.

Micro-chunk optimizer system 104 may generate micro-chunks by grouping some of the flagged frames together. The micro-chunk may be as long as needed without having a length that exceeds a threshold. That is, the micro-chunk may be limited in length to avoid having to re-encode large portions of the video together. If a large portion is included in one micro-chunk, the micro-chunk may contain content or video frames that may not share similar video characteristics, such as spatial and temporal characteristics. A smaller micro-chunk may have a higher probability of having similar characteristics compared to a larger chunk.

Figure 3:
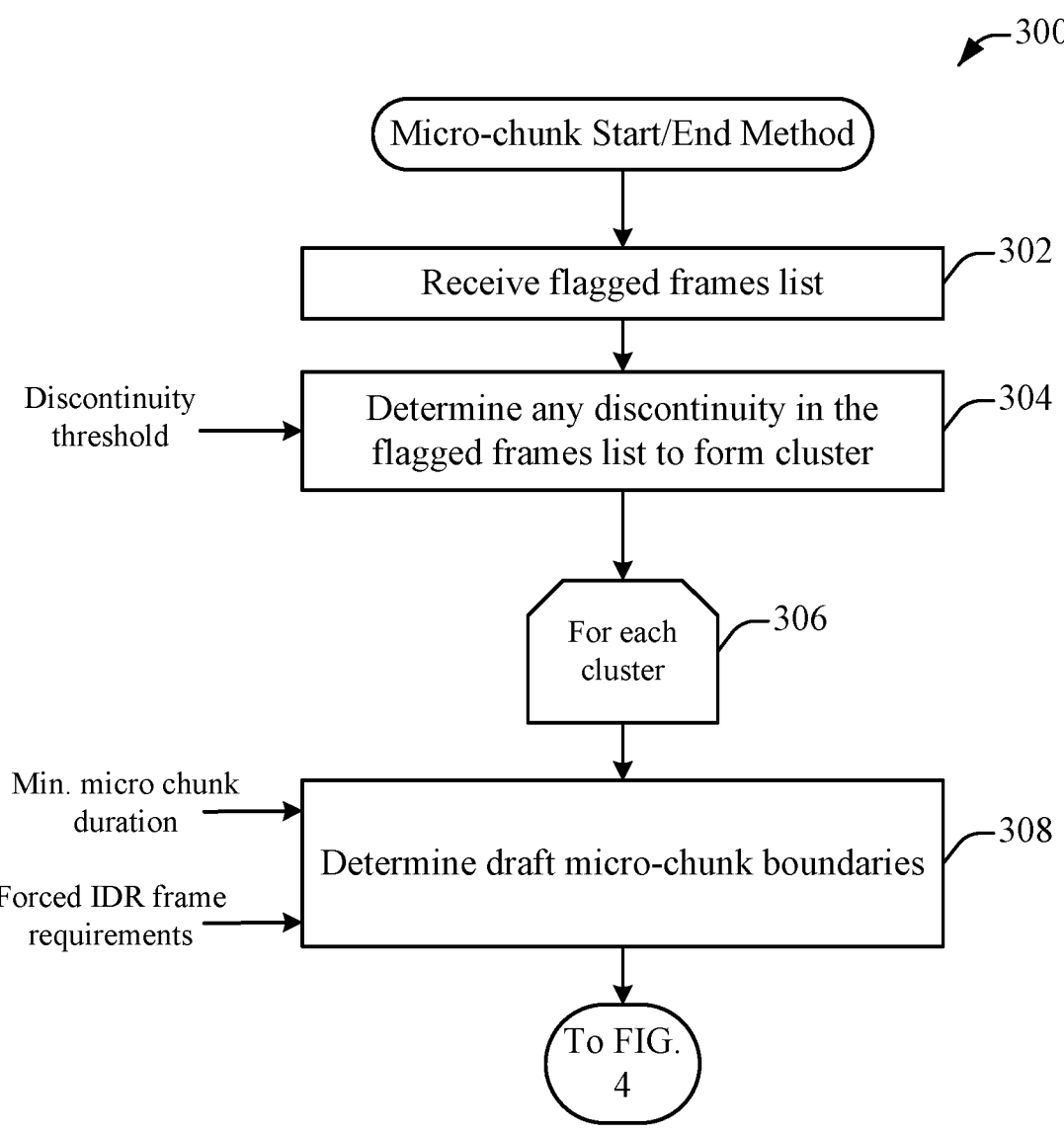
FIG. 3 depicts a simplified flow chart of a method for determining draft micro-chunk boundaries according to some embodiments.
Figure 4:
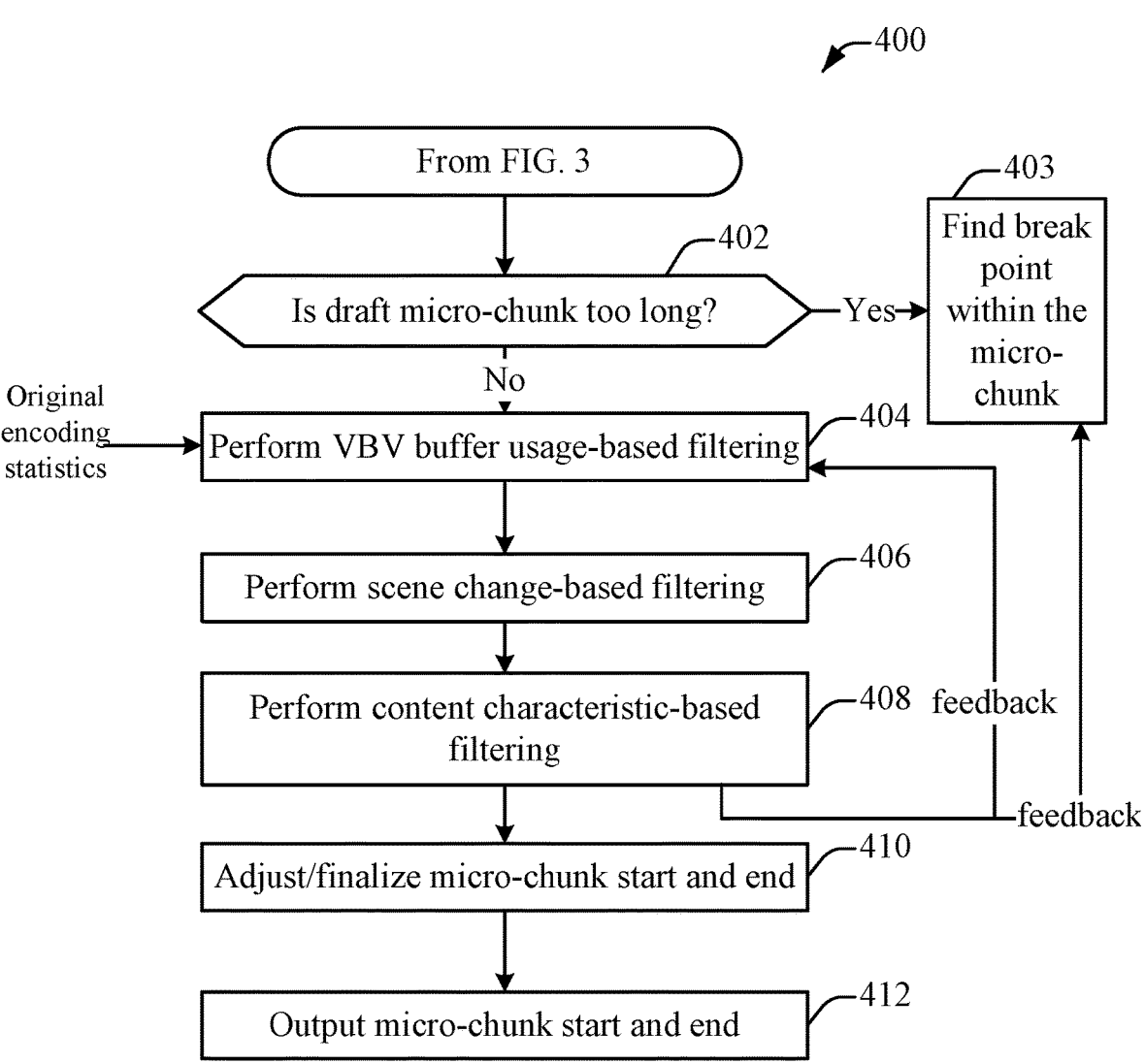
FIG. 4 depicts a second part of determining micro-chunk boundaries according to some embodiments.

FIGS. 3 and 4 describe an example of determining micro-chunk boundaries according to some embodiments. FIG. 3 depicts a simplified flow chart 300 of a method for determining draft micro-chunk boundaries according to some embodiments. At 302, micro-chunk optimizer system 104 receives the flagged frames list. Micro-chunk optimizer system 104 may process the flagged frames to group scattered but otherwise nearby frames into clusters. Different methods to cluster the flagged frames may be used. For example, at 304, micro-chunk optimizer system 104 determines discontinuities in the flagged frames list to form groups. In some embodiments, micro-chunk optimizer system 104 receives a discontinuity threshold that is used to determine if flagged frames belong to the same group or not. In the process, micro-chunk optimizer system 104 may start with a current flagged frame and form a boundary using the discontinuity threshold around the identified frame. The current frame may be selected as a first flagged frame from the beginning of the video, be randomly selected, or be user selected. If a neighboring flagged frame meets the discontinuity threshold in distance from the current flagged frame, then the neighboring flagged frame may be included in the cluster. For example, if the current flag frame is at the index 100 and the threshold is 20 frames, micro-chunk optimizer system 104 may determine whether there are any neighboring flagged frames within the boundary, which may be forward or backwards. For example, any flagged frames within the index 80 to 120 may be included in the group. The boundary may be extended as frames are added. For example, if a frame is added at an index of 120, then the boundary may be extended to an index of 140 by adding the discontinuity threshold to the index of the newly added frame. This process continues until no further frames meet the threshold or the micro-chunk length is met. Once forming a cluster, another flagged frame may be selected, such as a flagged frame that is after the just selected cluster. Although the above process is used to form clusters of flagged frames, other processes may be used, such as automatic clustering processes that receive the flagged frames indexes and automatically form clusters based on different algorithms.

Once the clusters are found, at 306, micro-chunk optimizer system 104 iterates over the clusters. For example, at 308, for each cluster, micro-chunk optimizer system 104 determines draft micro-chunk boundaries. The draft micro-chunk boundaries may be based on different requirements. For example, a minimum micro-chunk duration may be required, which may be a minimum number of frames or a time period, such as seconds. The minimum micro-chunk duration may be needed to make the rate control of the encoder stable or efficient. Another requirement may be forced IDR frame requirements. For example, IDR frame requirements may mandate that a start frame and an end frame of a chunk must be at a shot boundary, which is a point of transition or change between consecutive shots in a video sequence. This requirement may be based on different encoding specifications requirements. Other requirements may also be used to identify draft micro-chunk boundaries. Once determining the draft micro-chunk boundaries, the process continues in FIG. 4.

FIG. 4 depicts a second part of determining micro-chunk boundaries according to some embodiments. The second part may analyze the draft micro-chunk boundaries to determine whether the draft micro-chunk boundaries should be changed. At 402, micro-chunk optimizer system 104 determines if the draft micro-chunk is too long. This requirement may be used due to the desire to optimize encoding parameter sets for smaller portions of video that may have common characteristics. If a draft micro-chunk is too long, the associated characteristics with the long micro-chunk may vary and the original problems with using the same encoding parameter set for the entire video may occur within a micro-chunk that is considered too long. Accordingly, if the draft micro-chunk is too long, at 403, micro-chunk optimizer system 104 determines a break point within the micro-chunk. Different methods could be used to determine a break point. For example, a video buffer verifier (VBV) level, scene change statistics, fixed cadence/threshold-based, etc. may be used to break up the micro-chunk into multiple micro-chunks. Feedback from content characteristics from 408 may also be used to find a break point within the micro-chunk. In some embodiments, the VBV buffer level data from the original encoding may be used to determine locations to divide a long micro-chunk. The VBV level is used by the encoder to control the bitrate and buffer occupancy of a compressed video stream during encoding and decoding. Areas of low VBV usage may be used as points to break up the micro-chunk. The scene statistics may be used to break a long micro-chunk at scene changes that occur within the long micro-chunk. Other methods may also be used to break the long micro-chunk into multiple micro-chunks, such as a set threshold that breaks a micro-chunk at a set number of frames.

Figure 5:
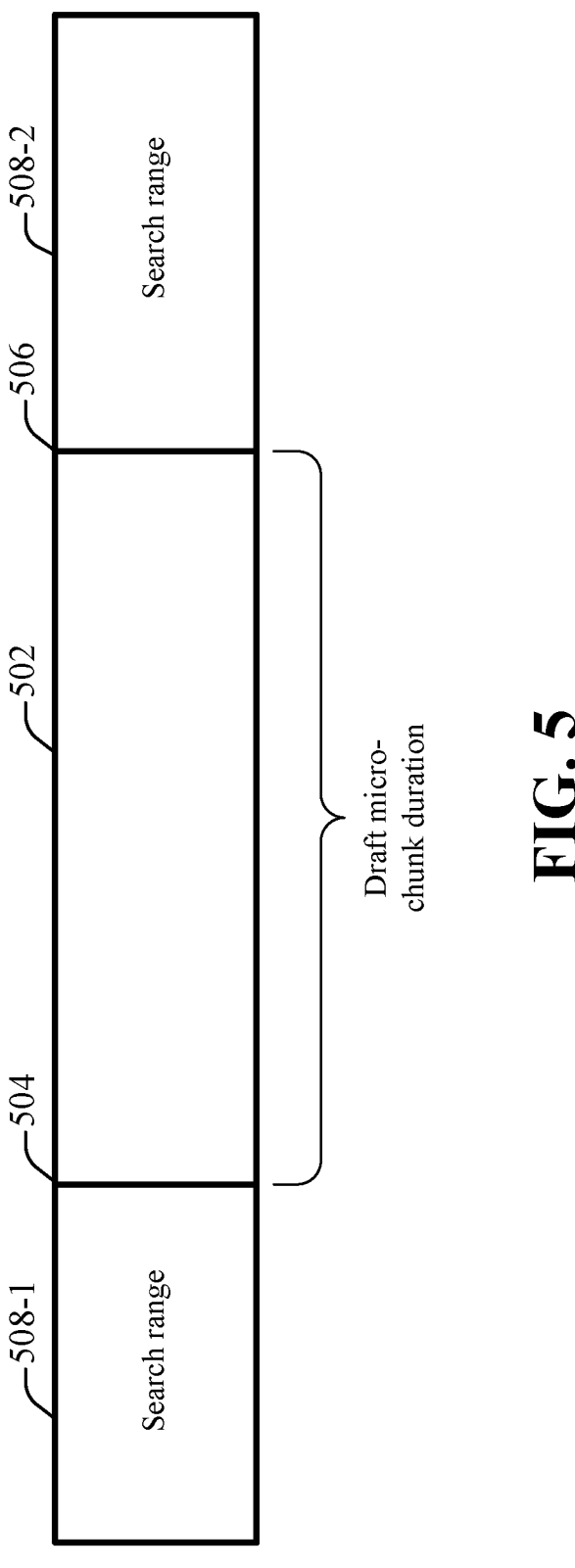
FIG. 5 depicts an example of search ranges for adjusting micro-chunk boundaries according to some embodiments.
Figure 6:
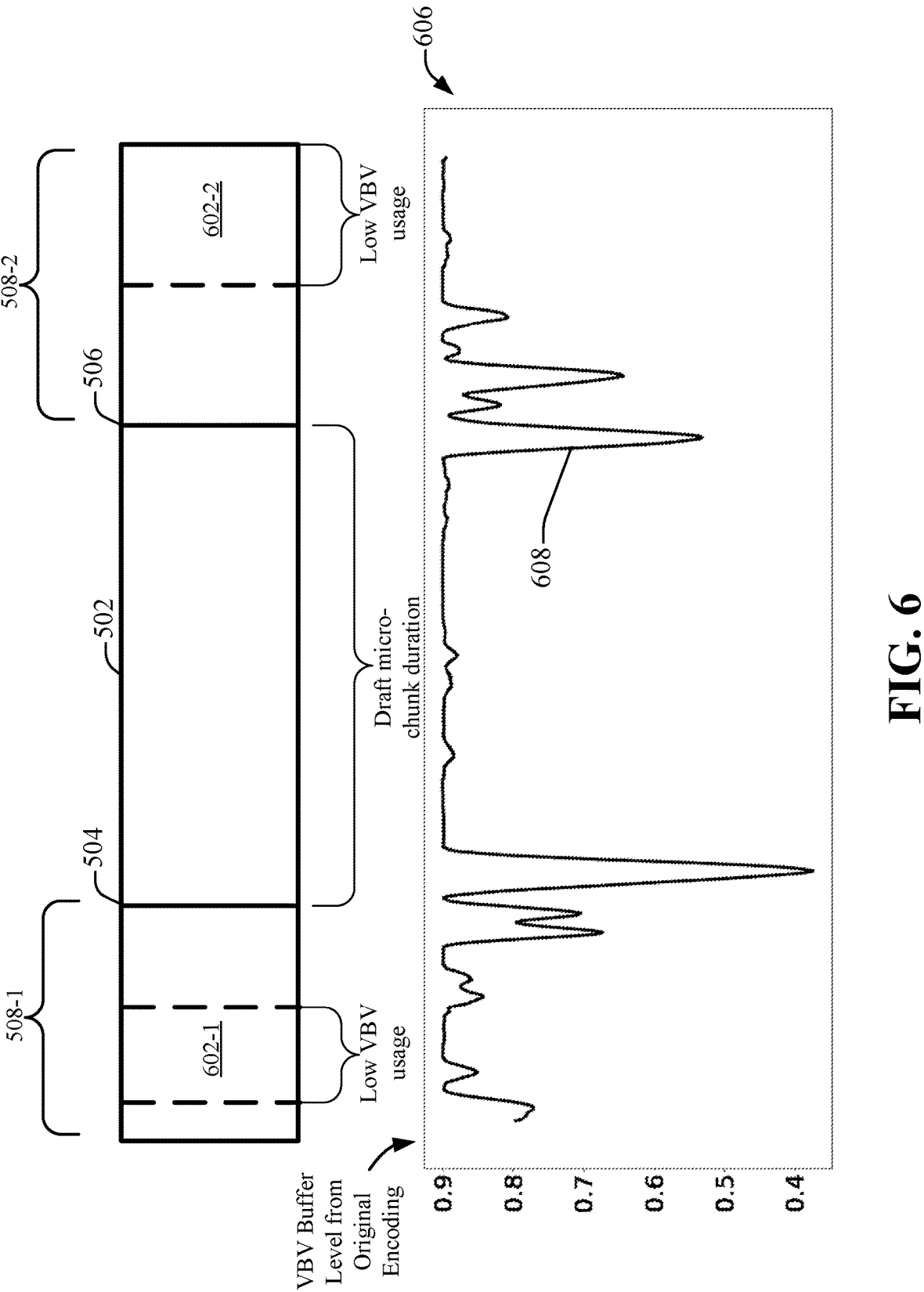
FIG. 6 depicts an example of performing video buffering verifier (VBV) usage-based filtering according to some embodiments.

Once an appropriately sized micro-chunk is determined, the process proceeds to finalize the micro-chunk start frame and end frame. The following steps may be performed sequentially, in parallel, or in different orders. Search ranges before the start frame and after the end frame of the draft micro-chunk boundaries are used to determine whether new micro-chunk boundaries should be determined. At 404, micro-chunk optimizer system 104 performs VBV buffer usage-based filtering. Micro-chunk optimizer system 104 may use the VBV usage from the original encoding statistics to adjust the start frame or end frame of the micro-chunk boundaries. As will be described in FIGS. 5 and 6, micro-chunk optimizer system 104 may attempt to determine micro-chunk boundaries where VBV usage is low. A threshold may be used to determine when usage is low (e.g., the VBV level is below a threshold). The VBV usage statistics is a measurement used during video encoding that may prevent buffer underflow or buffer overflow. When VBV buffer level of the original encode is already high, any additional bits spent on micro-chunk encoding may result in a violation of VBV buffer model, which may result in playback failures on clients. Therefore, it may be desirable to have a boundary where VBV usage is low to allow for overhead in which the bitrate can be increased in the re-encoding without violating VBV usage requirements. The output of the VBV buffer usage-based filtering may be revised search ranges. FIGS. 5 and 6 describe the determination of the revised search ranges using VBV usage-based filtering in more detail.

At 406, micro-chunk optimizer system 104 performs scene change-based filtering. For example, micro-chunk optimizer system 104 may search for scene changes in the revised search ranges to find a place where the micro-chunk can start with a new frame or end with a new frame. Another filtering technique may be to make sure that the selected start frame or end frame is not at a busy action part of the video in which many short scenes are expected. This may be measured by computing the average distance between scene changes and the variance of the duration of these scenes. Selecting the start frame or end frame at the boundary of a new scene may improve the re-encoding of the micro-chunk because content before a scene change and content after a scene change may be different. Thus, the optimized encoding parameter set for the content before the scene change may be different for the content after the scene change. The output of the scene-based filtering may be a ranked list of possible start frames and end frames from within the revised search ranges, or just one start frame and one end frame. The scene change-based filtering will be described in more detail in FIG. 7.

At 408, micro-chunk optimizer system 104 performs content characteristics-based filtering. This process may be optional or may be required. In this case, the content of the micro-chunk may be analyzed to determine if the start frame or end frame should be changed. If there are any changes in content characteristics based on the micro-chunk boundaries, micro-chunk optimizer system 104 may adjust the micro-chunk boundaries accordingly. For example, micro-chunk optimizer system 104 may determine if the draft micro-chunk contains more than one characteristic. If so, micro-chunk optimizer system 104 determines if the micro-chunk can be split and still be larger than the minimum chunk duration threshold. Then, micro-chunk optimizer system 104 may split the micro-chunk where the change in characteristic occurs, and then feedback is sent to perform the VBV buffer usage-based filtering at 404 and scene change-based filtering at 406 again with the split chunk. Also, as will be discussed below, the content characteristics-based filtering may be used to select one of the ranked list of start frames and end frames.

At 410, micro-chunk optimizer system 104 adjusts and finalizes the micro-chunk start frame and end frame based on the analysis of 404, 406, and 408. At 412, micro-chunk optimizer system 104 outputs the micro-chunk start and end frames, which can be used by encoding parameter tuner 106.

Before discussing encoding parameter tuner 106, the VBV buffer usage-based filtering, the content characteristics-based filtering, and content characteristics-based filtering will be discussed in more detail.

FIG. 5 depicts an example of search ranges for adjusting micro-chunk boundaries according to some embodiments. A draft micro-chunk is shown at 502. A start frame boundary is shown at 504 and an end frame boundary is shown at 506 for the micro-chunk. This forms a draft micro-chunk duration. A first search range 508-1 is found before the start frame and a second search range 508-2 is shown after the end frame. Micro-chunk optimizer system 104 may search for different start frames or end frames for the micro-chunk in the search ranges. The search ranges may be determined using different methods. For example, a threshold may be used to form the search range, such as a search range may be 100 frames before the start frame and 100 frames after the end frame. Other methods may also be used, such as a percentage of the draft micro-chunk duration may be used to determine the search range, such as if the draft micro-chunk duration is 200 frames, 20% of the number of frames of the draft chunk duration is taken as the search range, which may be 40 frames.

Once the search ranges are determined, VBV usage-based filtering is performed. FIG. 6 depicts an example of performing VBV usage-based filtering according to some embodiments. Micro-chunk optimizer system 104 may use the original encoding statistics to determine areas of low VBV usage areas. For example, areas of low VBV usage are shown at 602-1 before the start frame at 504, and at 602-2 after the end frame at 506. In some embodiments, micro-chunk optimizer system 104 defines a lower VBV usage via a moving average with a window size at around half of a buffer size length. In the example shown in FIG. 6, the specific window size may be set at one second (or 24 frames for a 24 Hz video). Micro-chunk optimizer system 104 then designates the level of VBV usage for each consecutive second in categories, such as low, mid, and high, based on thresholds, such as less than 0.5 is high, between 0.5 to 0.85 is mid, and greater than 0.85 is low. VBV buffer level here means how much of the buffer is still available. In this case, only 15% of the buffer is being occupied. Micro-chunk optimizer system 104 may then find areas, such as one area before the start frame, and another area after the end frame, in which the longest streak of sustained low VBV usage is observed. Although the two areas are described, more than two areas may be found. Further, in an unlikely case of there not being a single low VBV usage area within the search range, micro-chunk optimizer system 104 may expand the search range and perform the search in the expanded search range.

A graph of VBV usage is shown at 606. The Y axis is VBV buffer level from the original encoding. The X axis corresponds to the encoding of the video. Line 608 indicates the value of VBV usage responding to the frames in the search ranges and the draft chunk duration. At the time corresponding to the frames at 602-1, the VBV usage meets the low threshold. Also, within the frames found at 602-2, the VBV usage also meets the low threshold. In some embodiments, micro-chunk optimizer system 104 determines two areas, one area before start frame 504 and one area after end frame 506, that includes the longest streak of sustained low VBV usage. That is, there may be other areas in the search range that include low VBV usage, but the longest streak is used. In other embodiments, multiple areas of low VBV usage may be used. The streak may be determined in different ways, such as VBV usage value must meet the threshold, the average of the VBV usage meets the threshold, etc. Micro-chunk optimizer system 104 may then search for a boundary within the areas of low VBV usage. For example, micro-chunk optimizer system 104 may search for a start frame boundary within search range 602-1 and an end frame boundary within search range 602-2 using scene change-based filtering.

Figure 7:
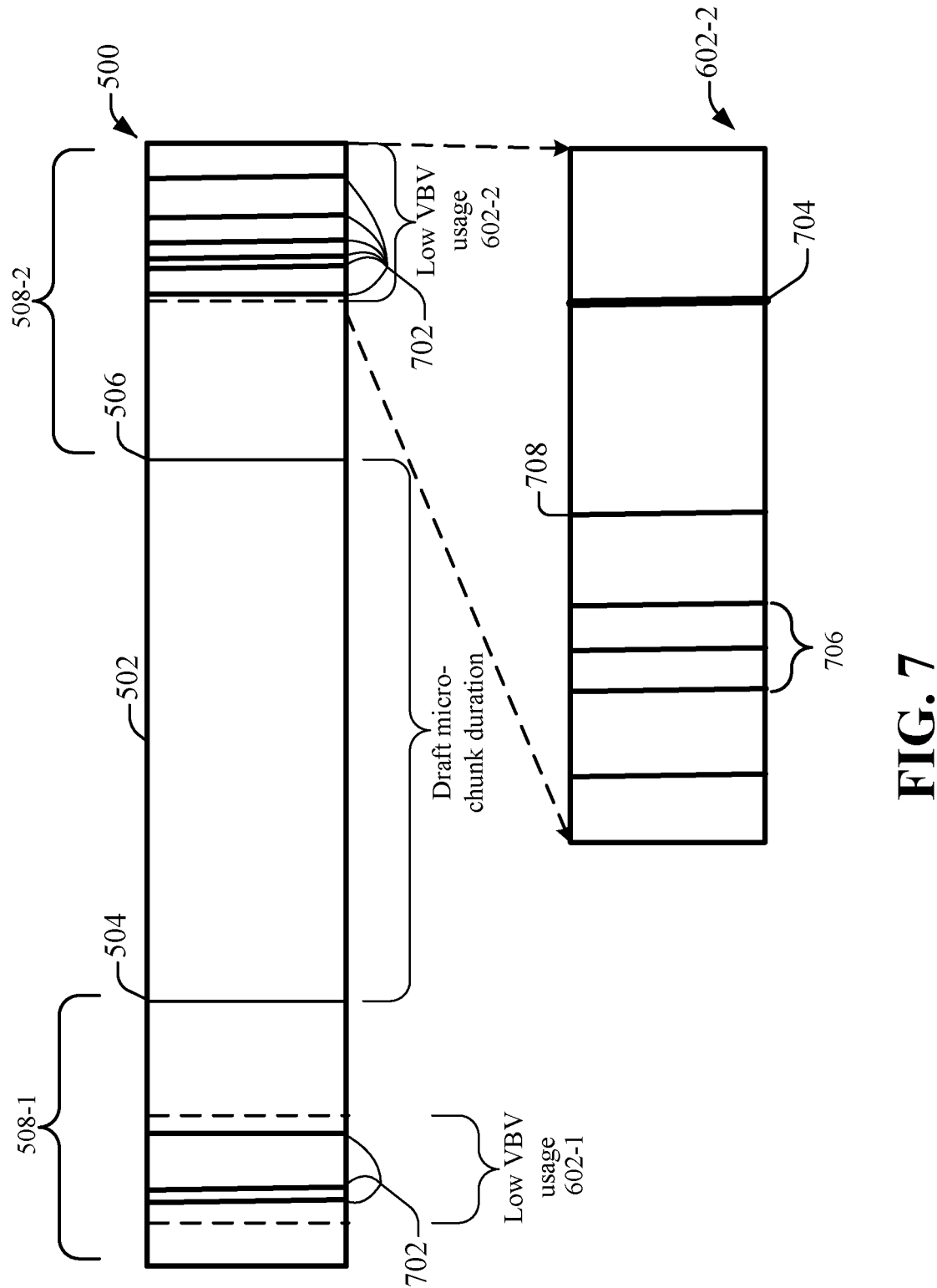
FIG. 7 depicts an example of scene change-based filtering according to some embodiments.

FIG. 7 depicts an example of scene change-based filtering according to some embodiments. Micro-chunk optimizer system 104 attempts to search within the adjusted search ranges 602-1 and 602-2 for scene changes. It may be preferable to set a micro-chunk boundary around a new scene change, or not place a micro-chunk boundary around multiple short scene changes.

Micro-chunk optimizer system 104 may define metrics, based on the statistics (mean, variance) of inter-scene distance and intra-scene duration, as indicators of which scene change point can be selected. In some embodiments, micro-chunk optimizer system 104 uses a scene change that is associated with a longest scene (e.g., looking forward in time, but backwards in time may be used also) while at the same time being a farthest inter-scene distance away from other scenes. For a given scene change, the intra-scene duration is defined as the length of forward time between this scene change and the next scene change. When this is the last scene before the end of the search range, micro-chunk optimizer system 104 uses the end of the search range to compute the scene duration. For a given scene change, the inter-scene distance may be defined as the average of distances to the two nearby scene change frames (e.g., backwards and forwards). For example, if a scene change is detected at frame 100, and the two nearby scene changes are detected at frame 70 and frame 115, respectively, the average distance is calculated at 27.5 frames. When one of the nearby scene changes cannot be found in either direction till the end of the search range, micro-chunk optimizer system 104 may use the distance to the other scene change directly (e.g., no average). When a case in which there was only one scene change within the search range, micro-chunk optimizer system 104 uses this scene change directly.

In FIG. 7, scene changes are inserted in search ranges 602-1 and 602-2 with lines indicated at 702. Search range 602-2 is then expanded to show the scene changes. Any scene change detection algorithm may be used, such as frame, pixel, and histogram differences or any other content analysis algorithm. It is noted that there may be times due to the short range that is in general used that there is only one or no scene changes being detected within search range 602-2. In this case, micro-chunk optimizer system 104 may return the closest frame to the start frame or end frame of the draft micro-chunk duration as the selected start frame or end frame if there are no scene changes. If there is one scene change, then a frame around the scene change may be returned.

In search range 602-2, the scene change at 704 may be selected. Micro-chunk optimizer system 104 selects a scene change at 704 because this scene change is farther away from multiple short scene changes found at 706. Also, the scene change at 704 may maximize the intra-scene duration, which is from this scene change to the end of search range 602-2. A scene change at 708 may not be selected even though it has a longer intra-scene duration because this scene change at 708 is close to other multiple scene changes, which indicate a large number of short scenes are expected, and may be a busy area of the video. The busy area of the video may not be a good area to select a scene change because the content may be changing drastically and more frequently compared to the scene change at 704. A threshold distance from multiple scene changes (e.g., two or more scene changes within a period) may be required to select a scene change. Also, instead of selecting a start frame and an end frame, a ranked list of preferred start frames and end frames may be provided to the content characteristic-based filtering. If the content characteristic-based filtering is not performed, then the selected start frame and end frame for the micro-chunk boundary using scene change-based filtering is output.

As discussed above, the content characteristic-based filtering may adjust the start frame and end frame based on analysis of the content characteristics. For example, the content characteristic-based filtering may first analyze the original draft micro-chunk duration. Micro-chunk optimizer system 104 may determine the content characteristics of the original micro-chunk. If the micro-chunk includes more than more content characteristic, and the micro-chunk can be split and still meet the minimum duration, micro-chunk optimizer system 104 may split the micro-chunk. The micro-chunks may then be re-analyzed using the VBV usage-based filtering and scene change-based filtering.

If the micro-chunk is not split, micro-chunk optimizer system 104 analyzes the content before the original start frame and after the original start frame. For example, 100 frames before the original start frame and 100 frames after the original start frame may be used. If the content characteristics are determined to be different (e.g., a difference between the two portions before and after the start frame does not meet a threshold), micro-chunk optimizer system 104 selects a top ranked scene change point before the start frame. The same process is performed for the original end frame where micro-chunk optimizer system 104 analyzes the content before the original end frame and after the original end frame. If the content characteristics are determined to be different (e.g., a difference does not meet a threshold), micro-chunk optimizer system 104 selects a top ranked scene change point after the end frame. The new micro-chunk that is formed may iteratively be analyzed using the content characteristics again, with scene changes in the ranked list selected until content characteristics before and after the boundaries are determined to be similar. The output is a start frame and an end frame based on the content characteristics analysis. The content analysis checks if the draft micro-chunk contains homogenous characteristics. This can mean the majority (e.g., above a threshold) of frames in the draft micro-chunk are identified with the same content label. If the content characteristics varies within the micro-chunk, the process may try to split and/or shorten the micro-chunk to only include a majorly homogenous characteristics.

As discussed above, the order of the VBV buffer usage-based filtering, the content characteristics-based filtering, and content characteristics-based filtering may vary. In some embodiments, the filtering may be performed independently and then a process may use the results to determine a start frame and end frame of the micro-chunk. For example, the three processes determine three different start frames and end frames. Then, an intersection of the three start frames may be used to determine a start frame and an intersection of the three end frames may be used to determine an end frame. Also, the three start frames may be analyzed to select one of the start frames, or a different start frame. The same process may be performed for the end frames.

The following will now describe the encoding parameter tuner operation after the start frame and end frame have been selected.

Encoding Parameter Tuner

Figure 8:
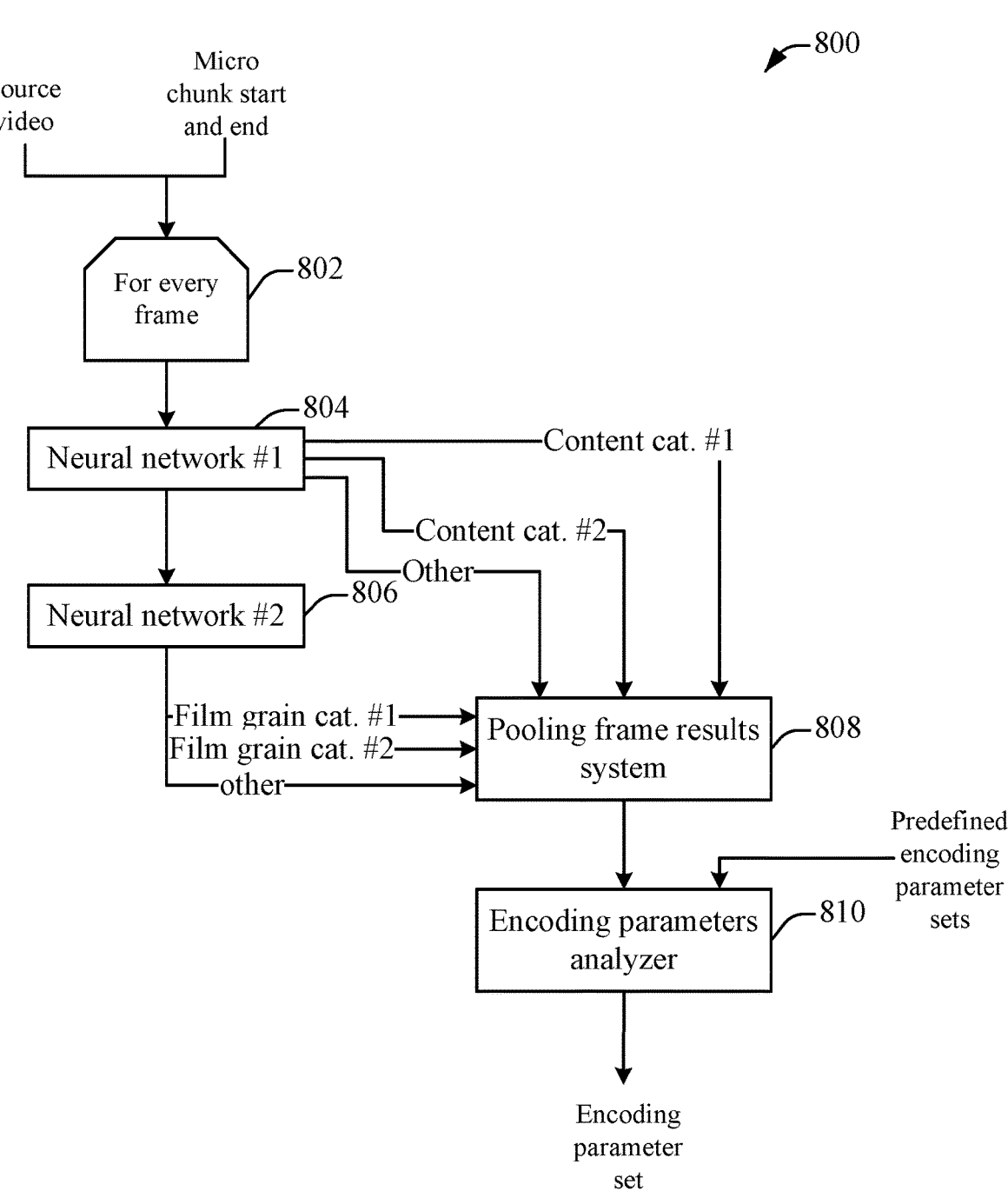
FIG. 8 depicts a first process for selecting an encoding parameter set according to some embodiments.

Encoding parameter tuner 106 may use different methods to select the encoding parameters. For instance, methods using machine learning or deep learning can directly predict the set of encoding parameters or they can also first extract features (e.g., low- or high-level features) that are then mapped to the encoding parameters. The following will discuss two different methods, but other methods may be appreciated. FIG. 8 depicts a first process for selecting an encoding parameter set according to some embodiments. Encoding parameter tuner 106 may use multiple neural networks, such as two neural networks, to determine the encoding parameter set. The use of the two neural networks is for illustrative purposes, and the methods for classifying in the different labels could be different, such as using different numbers of neural networks. At 802, encoding parameter tuner 106 receives the source video and the micro-chunk start frame and end frame. Then, at 802, for frames within the micro-chunk from the start frame to end frame, the following process may be performed. At 804, a first neural network #1 may be trained to identify if the frame is within a pre-defined content category, such as hand-drawn animation, nature content, or other category. The categories are shown with labels of content category #1, content category #2, and other category. The other category is used if the content cannot be classified in the pre-defined categories. In some embodiments, the neural network may analyze the content of a frame and classify the content into one of the categories. In other embodiments, the first neural network may output confidence scores that predict whether the content falls within each of the respective categories.

A second neural network #2 may be trained to identify different aspects of a characteristic of the content of the frame, such as film grain (e.g., noise). If film grain is being used, the aspects of film grain may be labeled as film grain category #1, film grain category #2, or other film grain category. The film grain categories may be based on describing different film grain aspects, such as space-like film grain, TV sitcom-like film grain, etc.

In some embodiments, the neural networks may be designed to work together. For example, if neural network #1 does not determine a content category (e.g., the other category is the highest ranked), then neural network #2 may be run to determine a film grain category. In other embodiments, neural network #1 and neural network #2 may both be run no matter the classification.

The categories may be associated with predefined encoding parameter sets. A pooling frame results system 808 may pool the results for the frames in the micro-chunk to determine a list of labels for the micro-chunk. For example, neural network #1 or neural network #2 return a prediction of content characteristics one frame at a time. To obtain the prevailing characteristic for the micro-chunk, pool frame result system 808 may use a pooling method, such as a consensus-based pooling method. In some embodiments, for every frame, pooling frame results system 808 builds a dynamic list of predicted labels. Pooling frame results system 808 may then determine a list of labels for the micro-chunk, such as based on a confidence level. For example, pooling frame results system 808 may process labels frame by frame and when a cumulative confidence of the labels exceeds a threshold, such as 0.8, pooling frame results system 808 outputs the list of labels. Then, pooling frame results system 808 selects one or more of the labels from the list.

In some embodiments, the label for the micro-chunk may be selected on weighted votes, where the weights are determined by confidence. For example, if the frame includes more than one label, the votes may split the confidence. That is, if two labels are picked for a frame, and one has a 0.6 confidence and the other has a 0.2 confidence, the first label gets ¾ of the one vote and the other category gets ¼ of the vote. The predicted label of the chunk may be chosen based on a majority rule of the votes. For example, the labels may be content category #1 (score 0.5), film grain category #1 (score 0.6), content category #2 (score 0.1), film grain category #2 (score 0.2), etc. Pooling frame results system 808 may select the label of film grain category #1 because it has the highest confidence score.

An encoding parameters analyzer 810 then selects the encoding parameter set based on the pooling frame results. For example, if one category is selected, such as film grain category #1, coding parameters analyzer 810 selects a predefined encoding parameter set for film grain category #1.

FIG. 9 depicts an example of predefined encoding parameter set for different labels according to some embodiments. A column 902 shows the category label and at column 904 shows the encoding parameter set.

The categories that could be selected include category #1, category #2, category #3, category #4, and other. Each category label may be associated with encoding parameter sets, such as encoding parameter set #1, encoding parameter set #2, encoding parameter set #3, encoding parameter set #4, and a default set. The other category is associated with the default set of parameters because the content could not be classified in a pre-defined category. The encoding parameter sets may be different combinations of parameter values based on the respective content characteristics of the category. Different combinations may include turning cuttree on and off, a high VBV rate, a low VBV rate, a quantization parameter value, a specific block partitioning mode, a specific motion estimation mode, etc.

Figure 10:
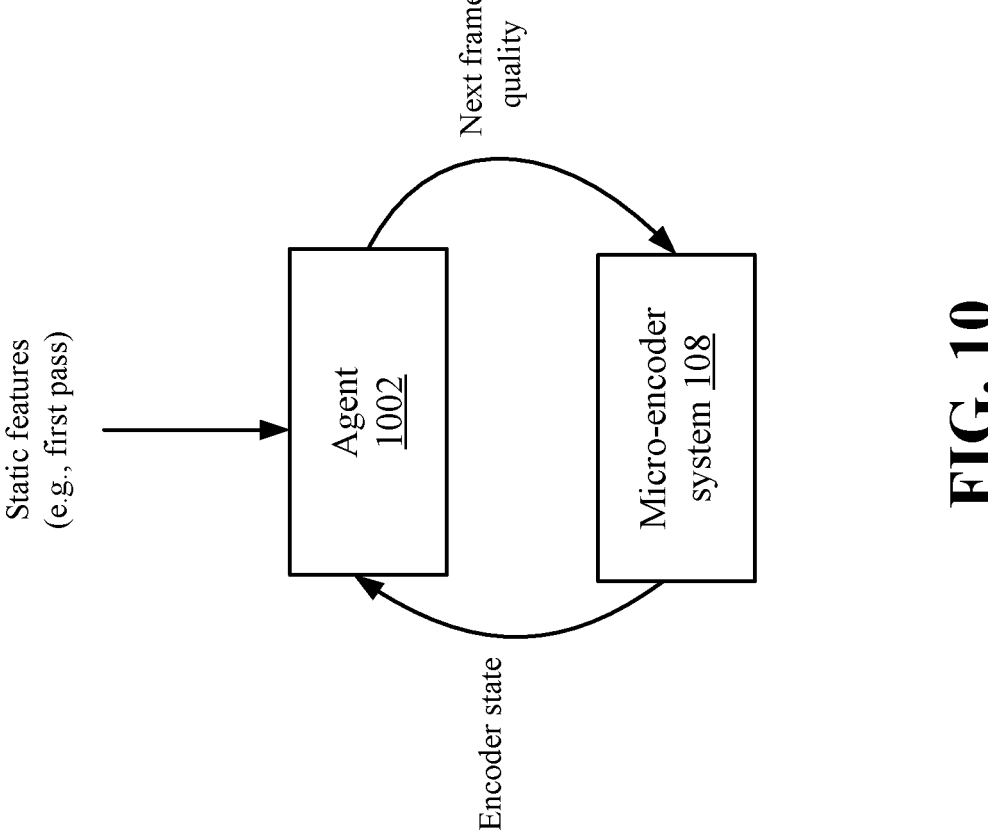
FIG. 10 depicts an example of a system for implementing a reinforcement learning process according to some embodiments.

Encoding parameter tuner 106 may also use a method that continuously learns to determine an optimal encoding parameter set. In some embodiments, a learning process (e.g., deep reinforcement learning) may be used. FIG. 10 depicts an example of a system 1000 for implementing a reinforcement learning process according to some embodiments. The process includes an agent 1002 and micro-encoder system 108. In particular, for some encoding parameters, the encoding process may be modeled as a reinforcement learning problem where the encoder runtime is modeled as an environment, and an agent 1002 is fed by the encoder state and a reward is computed based on the immediate action (or the set of actions that compose an episode) taken by agent 1002. In some embodiments, the reward may be modeled by the quality of the encoding of the micro-chunk subjected to a bitrate target. An action by agent 1002 may be specific encoding parameters to be used, such as turning cuttree on and off, a quantization parameter value, a VBV-usage rate, a specific block partitioning mode, a specific motion estimation mode, etc. In some embodiments, agent 1002 uses a mathematical reward for optimizing the quality. Different quality metrics may be used (e.g., peak signal-to-noise ratio, structural similarity, or, ideally, more perceptually-based metrics) which may be used to optimize for the encoding parameter. One example of a possible reward function is:

$$\text{reward value} = \frac{\text{quality metric}_{frame}}{\max(1, \text{overshoot}^2)},$$

where overshoot may be defined by the delta between the actual bitrate and the target bitrate. Based on the reward value, a neural networked trained in a reinforcement learning settings is then able to ideally learn the best encoding parameter for micro-encoder system 108. In some embodiments, an asynchronous advantage actor critic architecture may be used that allows multiple agents to interact with the reinforcement learning environment. This enables the system to control and optimize multiple encoding parameters at the same time and reach the optimal state faster.

The output of the reinforcement learning process may be a list of frame quantization parameters or other encoding parameters for the micro-chunk. Micro-encoder system 108 can then use the values to encode frames for the micro-chunk. The reinforcement learning process may continually learn the most optimal parameters based on the encodings that are encountered. That is, agent 1002 may continually adjust the parameters in the encoding parameter set based on feedback from micro-encoder system 108.

Although the above method applies reinforcement learning at the frame level, the reinforcement learning process may be extended to the sub-frame or block level or to multiple frames.

Conclusion

Accordingly, a process for re-encoding portions of a video may be performed more efficiently and optimally. For example, the chunk boundaries for micro-chunks may be optimally determined. Also, the parameters for the micro-chunk may also be optimally determined, which results in a re-encoding of portions of a video in a more resource-computation efficient process with more optimal parameters.

System

Figure 11:
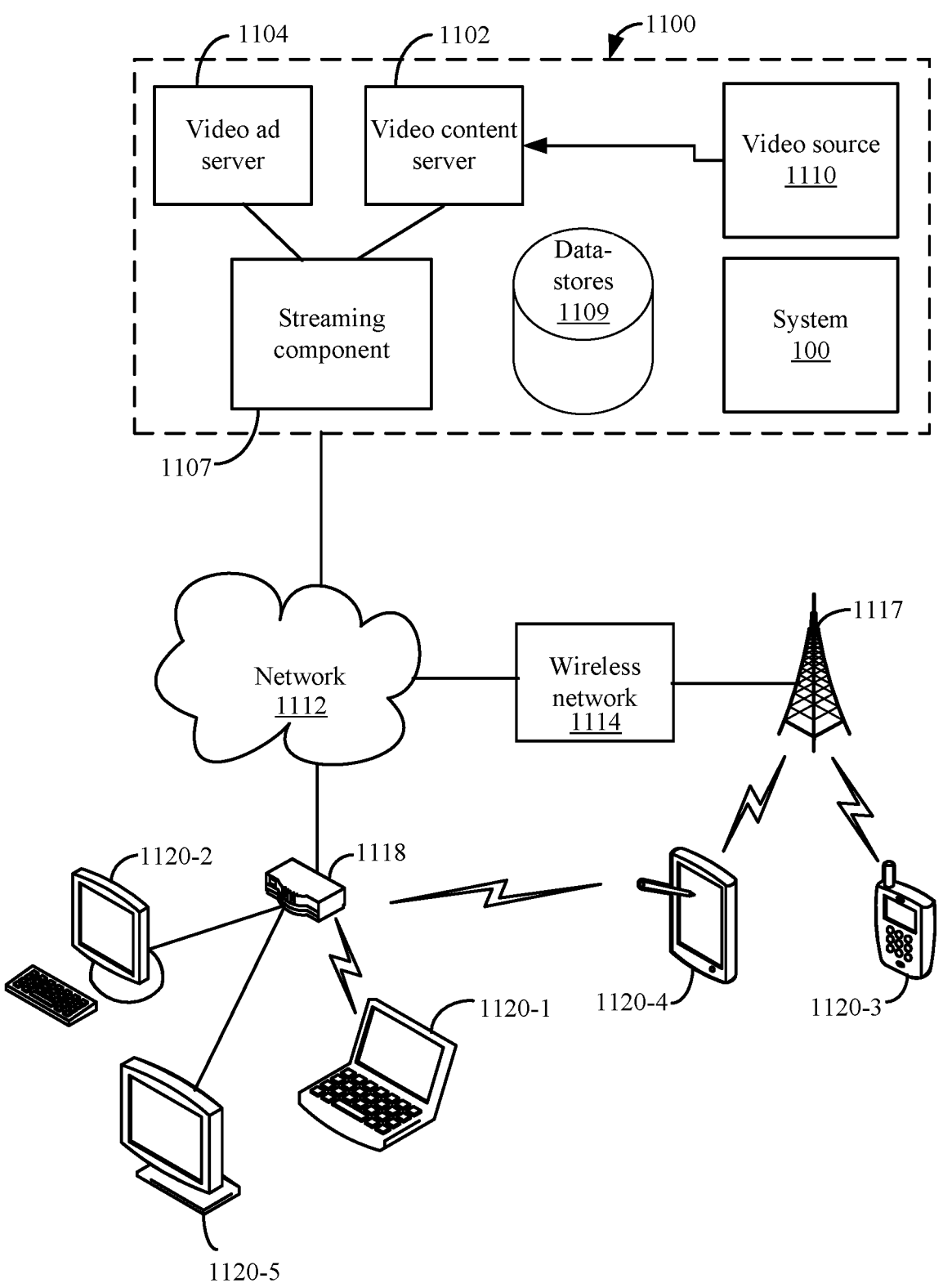
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1100, video data may be obtained from one or more sources for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1104, and 1107 distributed over one or more computers. Each server 1102, 1104, 1107 may include, or may be operatively coupled to, one or more data stores 1109, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1100, a public service message, or some other information. The video advertising server 1104 may serve the video advertising segments as directed by a user interface controller (not shown).

The video streaming system 1100 also may include system 100.

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example, administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless network 1114 (e.g., a wireless cellular telecommunications network (WCS)), or some combination of these or similar networks.

One or more client devices 1120 may be in communication with the video streaming system 1100, via the data communication network 1112, wireless network 1114, or another network. Such client devices may include, for example, one or more laptop computers 1120-1, desktop computers 1120-2, "smart" mobile phones 1120-3, tablet devices 1120-4, network-enabled televisions 1120-5, or combinations thereof, via a router 1118 for a LAN, via a base station 1117 for wireless network 1114, or via some other connection. In operation, such client devices 1120 may send and receive data or instructions to the system 1100, in response to user input received from user input devices or other input. In response, the system 1100 may serve video segments and metadata from the data store 1109 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing network conditions as the video is played. These control messages can include commands for enabling control functions such as fast forward, fast reverse, pausing, or seeking to a particular part of the file at the client.

Since streaming component 1107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1107 may use TCP-based protocols, such as HyperText Transfer Protocol (HTTP) and Real Time Messaging Protocol (RTMP). Streaming component 1107 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-perview service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
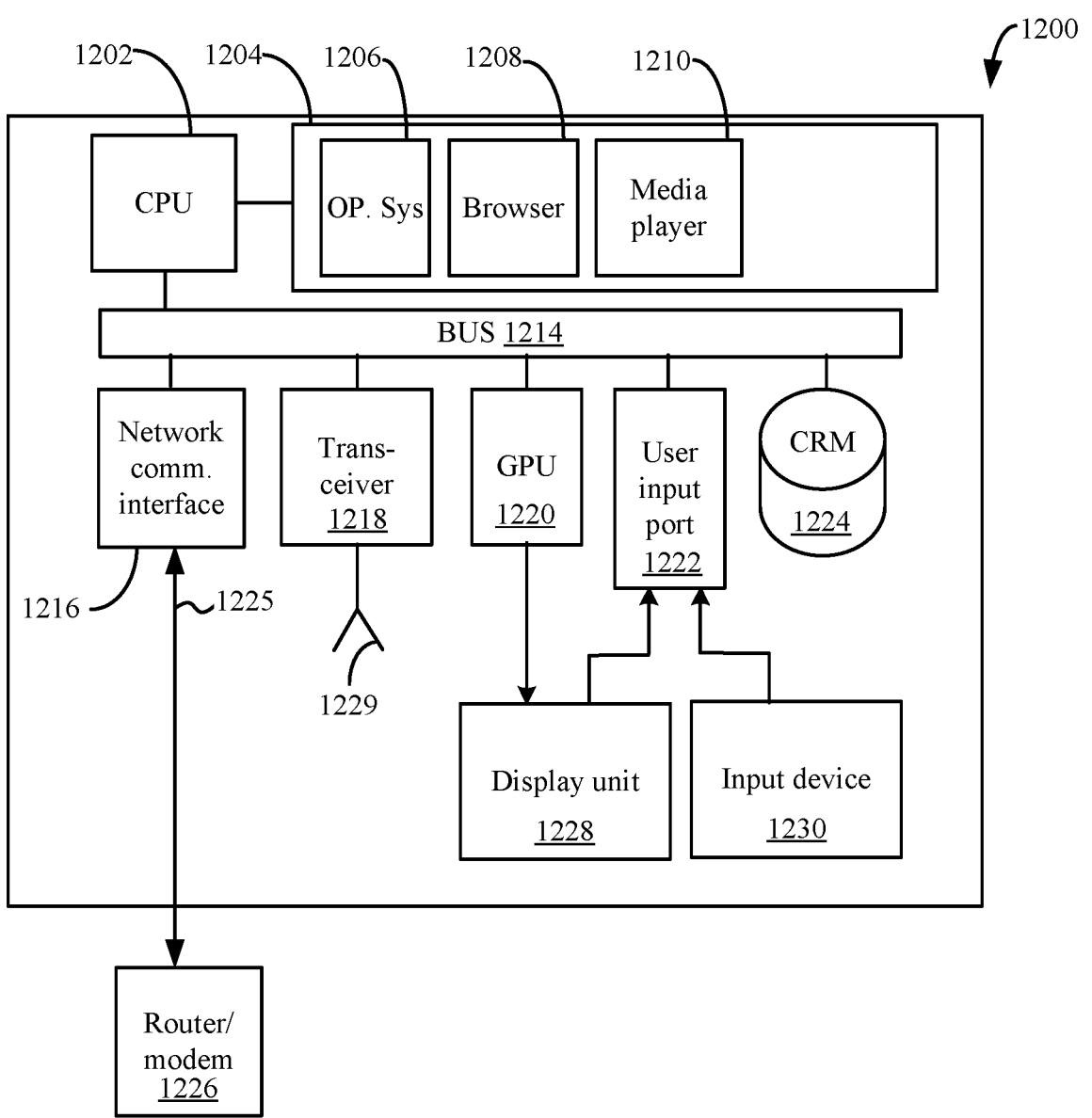
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 1210 for playing video. The memory 1204 may hold additional modules not shown in FIG. 12, for example modules for performing other operations described elsewhere herein.

A bus 1214 or other communication components may support communication of information within the apparatus 1200. The processor 1202 may be a specialized or dedicated microprocessor configured or operable to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium in a storage device 1224 may be connected to the bus 1214 and store static information and instructions for the processor 1202; for example, the storage device (CRM) 1224 may store the modules for operating system 1206, browser 1208, and media player 1210 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured or operable to perform one or more operations of a method as described herein.

A network communication (comm.) interface 1216 may also be connected to the bus 1214. The network communication interface 1216 may provide or support two-way data communication between the apparatus 1200 and one or more external devices, e.g., the streaming system 1100, optionally via a router/modem 1226 and a wired or wireless connection 1225. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera, or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   analyzing flagged frames from a plurality of frames in an encoding of a video to form a cluster of frames, wherein the cluster includes a plurality of flagged frames;
   determining draft micro-chunk boundaries for the cluster of a first start frame and a first end frame in the encoding that includes the cluster;

searching in a first search range before the first start frame and a second search range after the first end frame for a second start frame in the first search range and a second end frame in the second search range, wherein the second start frame and the second end frame form a micro-chunk;
   analyzing multiple frames based on the second start frame and the second end frame to determine content characteristics for the micro-chunk;
   determining an encoding parameter set for the micro-chunk formed by the second start frame and the second end frame based on mapping the content characteristics of the micro-chunk to the encoding parameter set; and
   using the encoding parameter set to encode the plurality of frames in the micro-chunk for insertion in the encoding of the video.

2. The method of claim 1, wherein the flagged frames are flagged based on a quality metric of the flagged frames meeting a threshold.

3. The method of claim 1, wherein a quality control process analyzes the encoding of the video based on a quality metric and outputs frames for the flagged frames in the encoding of the video.

4. The method of claim 1, wherein analyzing the flagged frames comprises:
   grouping a portion of flagged frames in the cluster when distance between frames of the portion of flagged frames in the encoding of the video meet a threshold.

5. The method of claim 1, further comprising:
   generating the first search range and the second search range based on a pre-set distance from the first start frame or the first end frame, or based on a length of the cluster.

6. The method of claim 1, wherein determining the draft micro-chunk boundaries comprises:
   determining the draft micro-chunk boundaries based on a minimum micro-chunk duration.

7. The method of claim 1, wherein searching in the first search range and the second search range comprises:
   determining a first usage area of video buffer verifier usage that meets a threshold in the first search range, wherein the video buffer verifier usage is determined during the encoding of the video; and
   determining a second usage area of video buffer verifier usage that meets a threshold in the second search range.

8. The method of claim 7, wherein the first usage area and the second usage area have video buffer verifier usage that is lower than another area of the first search range or the second search range.

9. The method of claim 1, wherein searching in the first search range and the second search range comprises:
   analyzing scene changes to select the second start frame or the second end frame.

10. The method of claim 9, wherein analyzing scene changes comprises:
   calculating, for a scene change, an intra-scene distance for a scene based on the scene change and an inter-scene distance between scenes, wherein the intra-scene distance is a length of forward time in the video between the scene change and a next scene change, and the inter-scene distance is an average of distances to two scene change frames; and
   selecting the scene change as the second start frame or the second end frame based on the intra-scene distance and inter-scene distance.

11. The method of claim 9, wherein analyzing scene changes comprises:

selecting the scene change as the second start frame or the second end frame based on a distance from multiple scene changes that are not within a threshold distance from the scene change.

12. The method of claim 1, wherein determining the encoding parameter set comprises:

analyzing content of the micro-chunk to classify the micro-chunk in a pre-defined category, wherein the encoding parameter set that is associated with the pre-defined category is used for the micro-chunk.

13. The method of claim 1, wherein determining the encoding parameter set comprises:

analyzing content of the micro-chunk to classify the micro-chunk in a pre-defined category that is based on an aspect of a content characteristic from a plurality of aspects of the content characteristic for the micro-chunk, wherein the encoding parameter set that is associated with the pre-defined category is used for the micro-chunk.

14. The method of claim 1, wherein determining the encoding parameter set comprises:

analyzing content of the micro-chunk to classify the micro-chunk in a first pre-defined category; and analyzing content of the micro-chunk to classify the micro-chunk in a second pre-defined category that is based on an aspect of a content characteristic from a plurality of aspects of the content characteristic for the micro-chunk, wherein the encoding parameter set that is associated with the first pre-defined category or the second pre-defined category is used for the micro-chunk.

15. The method of claim 1, wherein determining the encoding parameter set comprises:

analyzing frames of the micro-chunk to classify the micro-chunk in a plurality of pre-defined categories, wherein each of the plurality of pre-defined categories is associated with a pre-defined encoding parameter set;

selecting a pre-defined category from the plurality of pre-defined categories; and using the pre-defined encoding parameter set as the encoding parameter set for the micro-chunk.

16. The method of claim 1, wherein determining the encoding parameter set comprises:

using a continuous learning process to select the encoding parameter set, wherein the continuous learning process continually learns the encoding parameter set to use when encoding micro-chunks.

17. The method of claim 16, wherein the continuous learning process comprises:

receiving a state of an encoder that is encoding micro-chunks; and generating a reward that is used to adjust the encoding parameter set.

18. A non-transitory computer-readable storage medium having stored thereon computer executable instructions, which when executed by a computing device, cause the computing device to be operable for:

analyzing flagged frames from a plurality of frames in an encoding of a video to form a cluster of frames, wherein the cluster includes a plurality of flagged frames;

determining draft micro-chunk boundaries for the cluster of a first start frame and a first end frame in the encoding that includes the cluster;

searching in a first search range before the first start frame and a second search range after the first end frame for a second start frame in the first search range and a second end frame in the second search range, wherein the second start frame and the second end frame form a micro-chunk;

analyzing multiple frames based on the second start frame and the second end frame to determine content characteristics for the micro-chunk;

determining an encoding parameter set for the micro-chunk formed by the second start frame and the second end frame based on mapping the content characteristics of the micro-chunk to the encoding parameter set; and using the encoding parameter set to encode the plurality of frames in the micro-chunk for insertion in the encoding of the video.

19. An apparatus comprising:

one or more computer processors; and a computer-readable storage medium comprising instructions for controlling the one or more computer processors to be operable for:

analyzing flagged frames from a plurality of frames in an encoding of a video to form a cluster of frames, wherein the cluster includes a plurality of flagged frames;

determining draft micro-chunk boundaries for the cluster of a first start frame and a first end frame in the encoding that includes the cluster;

searching in a first search range before the first start frame and a second search range after the first end frame for a second start frame in the first search range and a second end frame in the second search range, wherein the second start frame and the second end frame form a micro-chunk;

analyzing multiple frames based on the second start frame and the second end frame to determine content characteristics for the micro-chunk;

determining an encoding parameter set for the micro-chunk formed by the second start frame and the second end frame based on mapping the content characteristics of the micro-chunk to the encoding parameter set; and using the encoding parameter set to encode the plurality of frames in the micro-chunk for insertion in the encoding of the video.

20. The non-transitory computer-readable storage medium of claim 18, wherein determining the encoding parameter set comprises:

analyzing content of the micro-chunk to classify the micro-chunk in a pre-defined category, wherein the encoding parameter set that is associated with the pre-defined category is used for the micro-chunk.

* * * * *